Feb. 24, 1970  J. A. MORTON ET AL  3,497,286
VARIABLE REFLECTANCE DISPLAY DEVICE
Filed Nov. 23, 1966
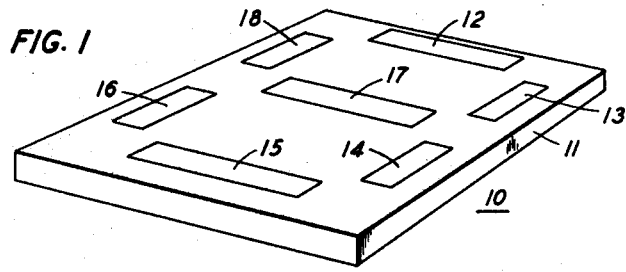
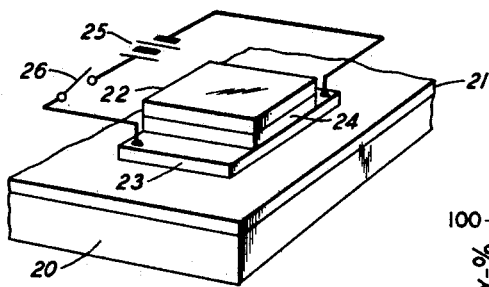
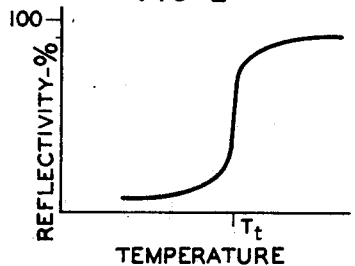
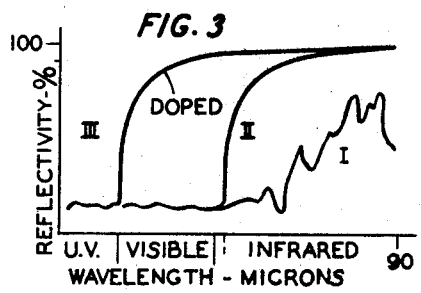
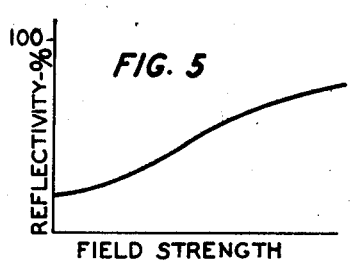
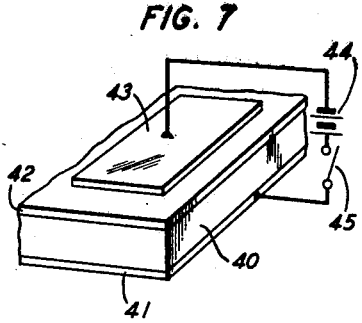
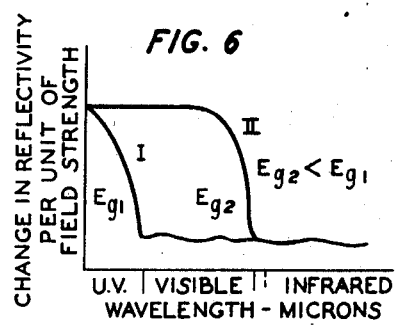
INVENTORS: J. A. MORTON
G. E. SMITH
BY
ATTORNEY

United States Patent Office 3,497,286
Patented Feb. 24, 1970

3,497,286
VARIABLE REFLECTANCE DISPLAY DEVICE
Jack A. Morton, South Branch, and George E. Smith, Murray Hill, N.J., assignors to Bell Telephone Laboratories, Incorporated, Murray Hill and Berkeley Heights, N.J., a corporation of New Jersey
Filed Nov. 23, 1966, Ser. No. 596,509
Int. Cl. G02b 1/28, 1/36, 5/00
U.S. Cl. 350—160                                17 Claims

ABSTRACT OF THE DISCLOSURE

A display device comprises a substrate upon which is disposed a plurality of thin films of a variable reflectance (thermoreflectance or electroreflectance) material defining a reflection pattern. Application of energy, either electrical or thermal, to such material changes its reflectivity. When the thin films are exposed to ambient light, applying energy to selected ones of the thin films alters the reflection pattern thereby forming a visible logical arrangement of the thin films in relation to one another.

---

This invention relates to display devices utilizing variable reflectivity materials.

Character display devices of the prior art include large display boards fabricated of incandescent lamp groupings which are adapted to be energized according to a preselected pattern to produce the desired characters. Character display devices are also fabricated of a plurality of conformed neon lamps wherein each character is separately formed from an individual neon lamp. Also suggested are character displays formed from glow discharge devices, and from electroluminescent diodes. The latter, however, are severely limited in both brightness and total light output.

When relatively small displays are desired, the problem of miniaturization and electrical connection of a plurality of incandescent sources renders such displays impractical.

In the case of neon lamp character displays, and particularly those of small size, the practical construction features of the neon lamps normally necessitate that each character be separate. In some cases these separately fabricated characters are superimposed one on top of another so that any character can be displayed from one location. Apart from construction difficulties and expense, this arrangement has the disadvantage that the character which is positioned at the bottom of the stack is impaired with respect to legibility.

One primary disadvantage of such prior art devices is the requirement of some internal light source, e.g., incandescent or neon lamp, and their inability to utilize ambient light sources.

It is an object of this invention to display intelligence in the form of visible characters which are logically arranged in relation to one another to impart information.

It is another object of this invention to display such intelligence by utilizing ambient light sources.

In accordance with an illustrative embodiment, the present invention comprises a substrate upon which are disposed a plurality of thin films of a variable reflectance material defining a reflection pattern. Application of energy, either electrical or thermal, to such a material changes its reflectivity. When the thin films are exposed to ambient light, for instance, applying energy to selected ones of the thin films, alters the reflection pattern thereby forming a visible logical arrangement (e.g., characters or numerals) of the thin films in relation to one another.

Variable reflectance can be described in terms of two separate and distinct physical effects: electroreflectance and thermoreflectance.

In electroreflectance materials, as used herein an electrode is provided adjacent to one surface of the material where light is made incident. It has been found that the reflectance of the light from such a surface (note that the light is not transmitted through the bulk of the material) is highly sensitive to a localized region of high electric field in the space charge layer at the surface of the material adjacent the electrode. A voltage, which provides electrical energy, is established across the space charge layer, and this voltage is varied in order to control the reflectivity of the material and thereby the intensity of the reflected light. Electroreflectance materials include, for instance, titanium dioxide, ferroelectric semiconducting materials such as potassium tantalate, and the tellurides of lead, tin and germanium.

An optical modulator utilizing ferroelectric semiconducting materials is disclosed in copending application of P. J. Boddy and A. F. Frova, Ser. No. 536,033, filed Mar. 21, 1966 and assigned to applicants' assignee. The use of absorptive titanium dioxide in an optical modulator is disclosed in the copending application of P. J. Boddy and A. F. Frova, Ser. No. 596,498, filed concurrently herewith, and assigned to applicants' assignee.

In thermoreflectance materials, on the other hand, it has been found that the reflectance of light from the material is highly sensitive to the temperature of the material. As used herein the term means materials which are characterized by a metal-semiconductor phase transition. That is, there is some transition temperature below which the material is a semiconductor and above which it is metallic. At this transition temperature the reflectivity of the material increases abruptly. The temperature of the material is raised to the transition temperature by application thereto of heat energy supplied, for instance, by passing an electric current through the material. By controlling the magnitude of the current, the temperature, and therefore the reflectivity, of the material can be varied in order to control the intensity of the reflected light. Thermoreflectance materials having a metal-semiconductor phase transition, for instance, include vanadium dioxide, vanadium monoxide and vanadium sesquioxide.

The use of the above thermoreflectance materials in an optical modulator is disclosed in the copending application of A. S. Barker, Jr. and H. W. Verleur, Ser. No. 596,565, filed concurrently herewith and assigned to applicants' assignee.

The above and other objects of the invention, together with its various features and advantages, can be easily understood from the following more detailed description taken in conjunction with accompanying drawings, in which:

FIG. 1 is a schematic of a general display device;

FIG. 2 is a graph of reflectivity versus temperature for a thermoreflectance material;

FIG. 3 is a graph of reflectivity versus wavelength showing the effect of doping a thermoreflectance material;

FIG. 4 is a perspective drawing of a portion of a display device using thermoreflectance materials;

FIG. 5 is a graph of reflectivity versus electric field strength in electroreflectance materials;

FIG. 6 is a graph of change in reflectivity versus wavelength showing the effect of using electroreflectance materials having low band gap energies; and FIG. 7 is a perspective drawing of a portion of a display device using electroreflectance materials.

Turning now to FIG. 1, there is shown a general display device 10 comprising a substrate 11 upon which are defined a plurality of variable reflectance regions 12 through 18 in turn defining a reflection pattern. By applying energy to selected ones of the regions, the reflectivity of the selected regions is changed and the reflection pattern is altered in order to form a visible logical arrangement to convey information, e.g., to form numerals.

For example, when light is made incident upon the device 10, application of energy to the regions 12, 13, 14, 15 and 17 causes the reflection pattern to exhibit the numeral "3." Similarly all the numerals from zero to nine can be produced. A more involved arrangement of regions would make it feasible to produce the letters of the alphabet as well.

The invention contemplates the use of both thermoreflectance and electroreflectance materials in defining the variable reflectance regions.

In thermoreflectance materials, as previously mentioned, it has been found that the reflectance of light from the material is highly sensitive to the temperature of the material. As shown in FIG. 2, thermoreflectance materials are characterized by a transition temperature $T_t$ at which the reflectivity of the material increases abruptly. Below $T_t$, where the material is a semiconductor, the reflectivity is about 10 to 20 percent. Above $T_t$, where the material is a metal, the reflectivity is nearly 90 percent. Typical thermoreflectance materials include vanadium monoxide VO, vanadium dioxide $VO_2$, vanadium sesquioxide $V_2O_3$, and titanium trioxide $Ti_2O_3$ which have respective transition temperatures of $-148°$ C, $68°$ C., $-95°$ C. and $327°$ C.

The large changes in reflectivity (e.g., 70 percent for vanadium dioxide) at the transition temperature are observed primarily for incident radiation in the infrared. Thus, it has been found, in addition, that the reflectivity of thermoreflectance materials is a function of the wavelength of incident radiation, as shown in FIG. 3 for vanadium dioxide. Below the transition temperature, as indicated by curve I, the reflectivity varies randomly with wavelength and is only about 5 to 10 percent in the visible. Above the transition temperature, as indicated by curve II, the reflectivity increases rapidly at about one micron and then levels off approaching nearly ninety percent at ninety microns, but changes only by a few percent (not shown) in the visible.

In order to utilize ambient (visible) light sources it is desirable that the reflectivity at the transition temperature change by approximately fifty percent. In order to accomplish this end, the carrier concentration of the thermoreflectance material is increased by doping. For example, doping vanadium dioxide with niobium shifts curve II of FIG. 3 to curve III thereby increasing the absolute reflectivity in the visible and in addition increasing the change in reflectivity at the transition temperature.

The principles of thermoreflectance are embodied in a display device, one of the variable reflectance regions of which is shown in perspective in FIG. 4. The display device, which comprises a plurality of such regions defining a reflection pattern (as shown in FIG. 1) includes a heat sink 20 upon which is affixed a heat insulator 21. An appropriately doped layer of crystalline vanadium dioxide 22, for instance, is electrically insulated from a resistive heater 23 by insulator 24. A source of energy, such as the battery 25, produces a heating current in the resistive heater 23 to raise the temperature of the layer above its transition temperature and thereby increase its reflectivity. A switch 26 is connected in series with the battery 25 and the resistive heater 23 in order to control the flow of energy to the vanadium dioxide layer. The switch may be incorporated in a control unit in order to control selectively which of the variable reflectance regions is to be activated, and thereby to alter the reflection pattern.

Alternatively the layer 22 may be directly heated by connecting the battery 25 and switch 26 in series with the crystalline vanadium dioxide, thereby eliminating the insulator 24 and the resistive heater 23.

The display device typically comprises a heat sink 20 of copper or platinum about 0.2 cm. thick, insulators 21 and 24 of silicon dioxide or silicon nitride about 1μ thick, a thin film of vanadium dioxide 22 about 0.2μ to 2μ thick, and a resistive heater 23 of tantalum about 1μ thick, all formed, for instance, by well-known thin film deposition techniques. These dimensions and materials are illustrative only and are not to be construed as limitations on the scope of the invention.

In contrast with thermoreflectance materials, in electroreflectance materials a space charge layer is typically provided in the surface of the material where light is made incident. It has been found, as shown in FIG. 5, that the reflectance of the light from such a surface (note that the light is not transmitted through the bulk of the material) is highly sensitive to a localized region of high electric field in the space charge layer. FIG. 5 shows that reflectivity increases monotonically as the electric field strength increases. The primary limitation on the magnitude of the electric field is the breakdown field of insulators which might be associated with the material. The electroreflectance material itself, however, is a semiconductor in order that the localized field be confined to the surface region, only, and not be created throughout the bulk of the material as would be the case if the material were an insulator. Electroreflectance materials include titanium dioxide, the perovskites potassium tantalate, potassium niobate and barium titanate, and the tellurides of tin, lead and germanium.

Electroreflectance as described above has been observed primarily in the ultraviolet as indicated by curve I of FIG. 6. In the visible the change in reflectivity is about ten percent, as for the pervoskite potassium tantalate, with a typical field strength of about $10^6$ volts/cm. To increase the changes in reflectivity the electric field strength may be increased, as indicated in FIG. 5. Fifty percent change in reflectivity is desirable in order to utilize ambient light sources in conjunction with the display device. Alternatively, because electroreflectance is primarily caused by fundamental band to band optical transitions, the use of materials having a band gap energy $E_g$ less than the photon energies of visible light (1.62 to 3.16 ev.) increases the change in reflectivity of the material in the visible. As shown in FIG. 6, curve I is for band gap energy $E_{g1}$ greater than the photon energies, and indicates low change in reflectivity in the visible. However, curve II is for band gap energies $E_{g2}$ less than the photon energies and indicates high change in reflectivity in the visible. Typical materials with $E_g$ about 0.3 ev. are the tellurides of lead, tin, and germanium.

A portion of a display device utilizing an electroreflectance material in an MIS structure (of the type disclosed in copending application of C. N. Berglund, Ser. No. 571,555, filed Aug. 10, 1966, and assigned to applicants' assignee) is shown in perspective in FIG. 7. For simplicity, only one of the plurality of regions of the reflection pattern is shown. On one surface of an electroreflectance material 40 is affixed a metal electrode 41. On the opposite surface is a transparent electrical insulator 42. On the insulator 42 is deposited a transparent thin film electrode 43 defining as a region the area of the material 40 adjacent the electrode 43. That region forms a space charge layer in the electroreflectance material 40 under the electrode 43 when an electric field, in the reverse bias direction, is established by connecting a battery 44 across the electrodes 41 and 43. The field is controlled by switch 45 in order to change the reflectivity of the material 40 in the defined region, and hence alter the reflection pattern.

The display device typically comprises an electroreflectance material 40 of potassium tantalate about 0.1 mm. thick, an electrode 41 of a chromium-gold alloy about 1μ thick, an insulator 42 of silicon dioxide or silicon nitride about 1μ thick, and an electrode 43 of tin oxide about 1μ thick, all formed, for instance, by well-known thin film deposition techniques. These dimensions and materials are illustrative only and are not to be construed as limitations on the scope of the invention.

In the alternative, the insulator 42 can be eliminated and a Schottky-space charge rectifying barrier established at the surface of the electroreflectance material by making the electrode 43 in direct contact with the material 40.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A display device comprising
   means for defining a plurality of regions of a thermoreflectance material characterized by the property that its optical reflectivity changes upon the application thereto of thermal energy,
   said regions defining a reflection pattern, and
   means for applying energy to selected ones of said regions to change their optical reflectivity thereby to alter said reflection pattern and to form a visible logical arrangement of said regions in relation to one another.

2. The display device of claim 1 wherein said region defining means comprises
   a substrate,
   a plurality of layers of said material disposed on said substrate, each of said layers comprising a separate one of said regions.

3. The display device of claim 1 wherein said region defining means comprises
   a single substrate of said material,
   a plurality of transparent members each disposed on said substrate thereby to define the portion of said substrate adjacent said member as one of said regions, and
   said means for applying energy comprises means for passing an electric current through selected ones of said transparent members.

4. The display device of claim 1 wherein said thermoreflectance material comprises vanadium monoxide.

5. The display device of claim 1 wherein said thermoreflectance material comprises vanadium dioxide.

6. The display device of claim 1 wherein said thermoreflectance material comprises vanadium sesquioxide.

7. The display device of claim 1 wherein said thermoreflectance material comprises titanium trioxide.

8. A display device comprising
   means for defining a plurality of regions of a semiconductive electroreflectance material characterized by the property that its optical reflectivity changes upon the application thereto of electrical energy,
   said regions defining a reflection pattern, and
   means for applying electrical energy to selected ones of said regions to change their optical reflectivity, thereby to alter said reflection pattern and to form a visible logical arrangement of said regions in relation to one another,
   said latter means comprising means for establishing a space charge layer in the surface of said material upon which optical radiation is made incident, said radiation penetrating said material to the depth of said space charge layer only.

9. The display device of claim 8 wherein said region defining means comprises
   a substrate,
   a plurality of layers of said material disposed on said substrate, each of said layers comprising a separate one of said regions.

10. The display device of claim 8 wherein said region defining means comprises
    a single substrate of said material,
    a plurality of transparent members each disposed on said substrate thereby to define the portion of said substrate adjacent said member as one of said regions, and
    said means for applying electrical energy comprising means for applying an electrical field between said transparent members and said substrate.

11. The display device of claim 8 wherein said electroreflectance material comprises titanium dioxide.

12. The display device of claim 8 wherein said electroreflectance material comprises barium titanate.

13. The display device of claim 8 wherein said electroreflectance material comprises potassium tantalate.

14. The display device of claim 8 wherein said electroreflectance material comprises potassium niobate.

15. The display device of claim 8 wherein said electroreflectance material comprises lead telluride.

16. The display device of claim 8 wherein said electroreflectance material comprises tin telluride.

17. The display device of claim 8 wherein said electroreflectance material comprises germanium telluride.

References Cited

UNITED STATES PATENTS

| 2,928,075 | 3/1960 | Anderson | 340—173 |
|---|---|---|---|
| 3,379,998 | 4/1968 | Soules et al. | 331—94.5 |
| 3,257,903 | 7/1966 | Marks | 88—61 |

OTHER REFERENCES

"Switching of Semiconductor Reflectivity by a Giant Pulse Laser," W. R. Sooy et al., Applied Physics Letters, Aug. 1, 1964, vol. 5, No. 3 pp. 54–56.

RONALD L. WIBERT, Primary Examiner

P. K. GODWIN, JR., Assistant Examiner

U.S. Cl. X.R.

350—288, 290

PO-1050
(5/69)

UNITED STATES PATENT OFFICE
CERTIFICATE OF CORRECTION

Patent No. 3,497,286     Dated February 24, 1970

Inventor(s) Jack A. Morton and George E. Smith

It is certified that error appears in the above-identified patent and that said Letters Patent are hereby corrected as shown below:

Before the Abstract of the Disclosure, please change the designation of Bell Telephone Laboratories, Incorporated as a "corporation of New Jersey" to a "corporation of New York".

SIGNED AND
SEALED
AUG 25 1970

(SEAL)
Attest:

Edward M. Fletcher, Jr.
Attesting Officer

WILLIAM E. SCHUYLER, JR.
Commissioner of Patents